3,546,634
FERRITE POLARIZERS COMPRISING LATCHABLE FERRITE BODIES
Leonard Dubrowsky, Baltimore, Md., assignor to Westinghouse Electric Corporation, Pittsburgh, Pa., a corporation of Pennsylvania
Filed July 31, 1968, Ser. No. 749,138
Int. Cl. H03h 7/18; H01p 1/16
U.S. Cl. 333—21
9 Claims

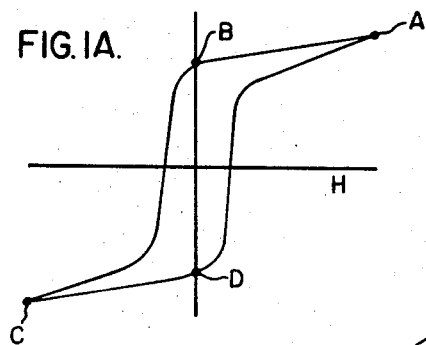
FIG. IA.
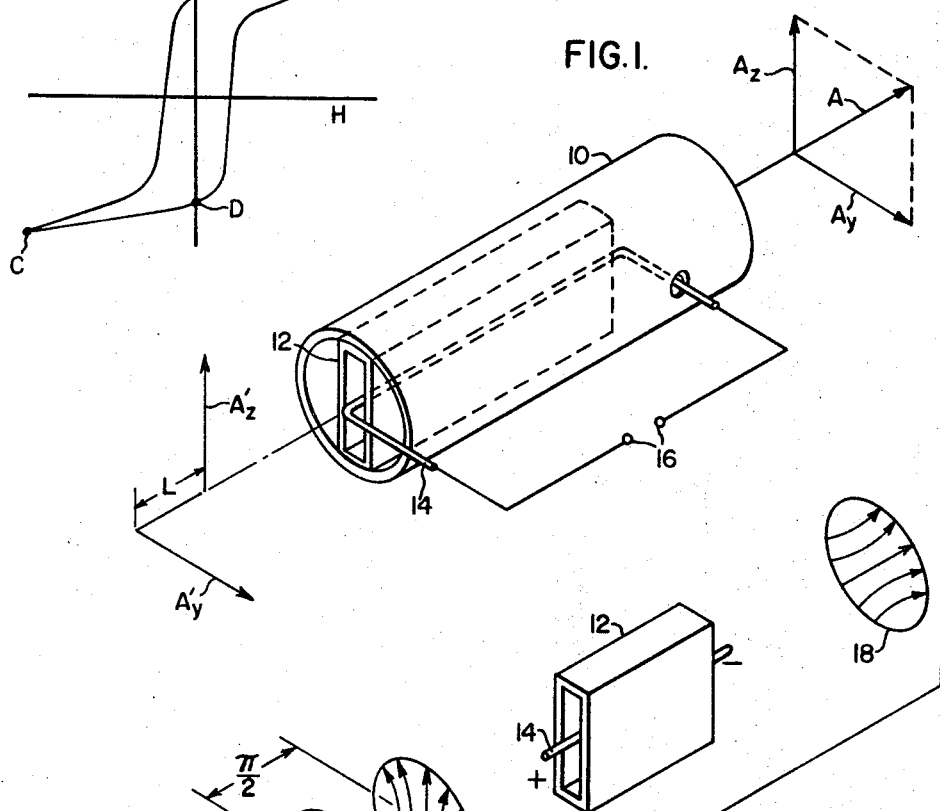
FIG. I.
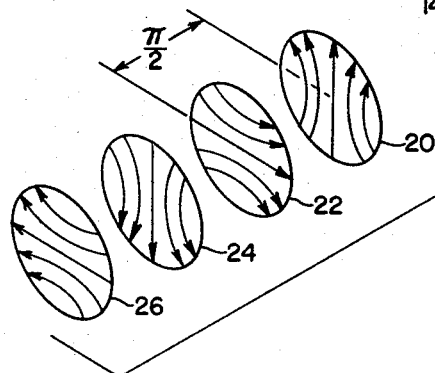
FIG. 2.
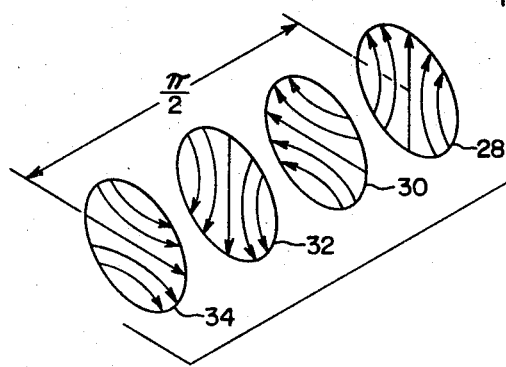
FIG. 3.
INVENTOR
Leonard Dubrowsky
BY F. H. Henson
ATTORNEY United States Patent Office 3,546,634
Patented Dec. 8, 1970

ABSTRACT OF THE DISCLOSURE

Described are electromagnetic wave transmission devices, such as wave guides, incorporating latchable ferrite phase shifters capable of converting linearly polarized wave energy into circularly polarized wave energy of either sense (i.e., clockwise or counterclockwise rotation of the electric vectors). Also described is a latchable ferrite phase shifter capable of reversing the sense of rotation of circularly polarized wave energy or for converting circularly polarized wave energy into linearly polarized wave energy of either sense.

BACKGROUND OF THE INVENTION

Devices for converting linearly polarized wave energy into circularly polarized wave energy for radar applications and the like are now well known and usually comprise a dielectric slab (i.e., quarter wave plate) in a wave guide disposed at an angle of 45° with respect to the electric vectors of incident linearly polarized wave energy. The sense of rotation of the circularly polarized wave energy is dependent upon whether the dielectric slab is rotated 45° to the right or left of the incident linearly polarized wave energy; however this must be achieved mechanically by physical rotation of the quarter wave plate.

Ferrite phase shifters are also well known and usually comprise a ferrite body extending longitudinally through a wave guide, together with an external permanent magnet or electromagnet which produces a magnetic field along the longitudinal axis of the wave guide. Such devices, however, are not ordinarily capable of converting linearly polarized wave energy into circularly polarized wave energy and require relatively large external magnets or electromagnets.

Recently, latchable ferrite devices have been developed which require no external magnetic bias. That is, the external magnet is replaced by a single wire, embedded axially in a ferrite material. In this manner, the magnetic field is inside the wave guide inself and no external magnet or electromagnet is required. By reversing the current through the single wire, the ferrite material can be driven to saturation in opposite directions. Such devices have been used to replace conventional ferrite phase shifters as shown, for example, in U.S. Pat. No. 3,340,484, issued Sept. 5, 1967.

SUMMARY OF THE INVENTION

As an overall object, the present invention seeks to provide a new and improved device for converting linearly polarized wave energy into circularly polarized wave energy, which device utilizes latchable ferrite devices.

More specifically, an object of the invention is to provide a device for converting linearly polarized wave energy into circularly polarized wave energy of either sense by means of an electrical signal in contrast to a conventional quarter wave plate where this conversion must be accomplished mechanically.

Still another object of the invention is to provide a phase shift device employing latchable ferrite phase shifters in pairs for reversing the sense of circularly polarized wave energy, or for converting circularly polarized wave energy into linearly polarized wave energy.

In accordance with the invention, a phase shifter is provided comprising a wave guide transmission line having a latchable ferrite body of generally rectangular cross section positioned therein and extending in parallel relation to the axis of the transmission line. The sides of the rectangular cross section of the ferrite body are at an angle of 45° to the electric vectors of linearly polarized wave energy passing through the transmission line. Extending through the ferrite body parallel to the axis of the transmission line is an electrical conductor through which an electrical current is caused to flow to create in the ferrite body a magnetic field at right angles to the length of the transmission line.

As will be seen, such latching ferrite devices may be used as quarter wave plates in circular wave guides to convert linearly polarized wave energy into circularly polarized wave energy. By reversing the flow of current through the center conductor of the latching ferrite, it is possible to switch rapidly between right-hand and left-hand circular polarization. Furthermore, by combining four 90° phase shifters appropriately in a circular wave guide, a device is produced which can create linear and circular polarization for both directions of propagation.

The above and other objects and features of the invention will become apparent from the following detailed description taken in connection with the accompanying drawings which form a part of this specification, and in which:

BRIEF DESCRIPTION OF DRAWINGS

FIG. 1. is a schematic illustration of the phase shifter of the present invention capable of converting linearly polarized wave energy into circularly polarized wave energy of either sense;

FIG. 1A illustrates the hysteresis loop of the ferrite material utilized in the device of FIG. 1;

FIG. 2 illustrates the field configurations of the electric vectors at spaced points along the device of FIG. 1 when current flows through the center conductor of the ferrite device in one direction;

FIG. 3 illustrates the field configurations of the electric vectors at spaced points along the wave guide of FIG. 1 when current flows through the center conductor of the ferrite device in the opposite direction;

DETAILED DESCRIPTION OF THE INVENTION

Figure 4:
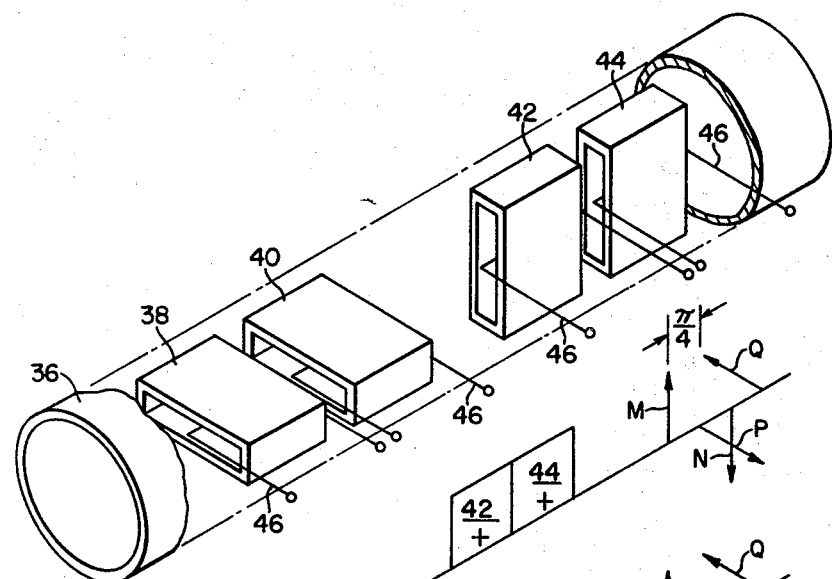
FIG. 4 is a schematic illustration of another embodiment of the invention employing pairs of latched ferrite devices disposed at 90° with respect to each other.

With reference now to the drawings, and particularly to FIG. 1, a section of a wave guide 10 is shown having an elongated ferrite plate 12 having a major and a minor axis disposed therein. The ferrite plate 12 may be any material which is insulating, magnetic, and has gyromagnetic properties. The material may, for example, be a cubic ferrite, a hexagonal ferrite, or a magnetic garnet.

Extending through the ferrite plate 12 is a conductor 14 having its opposite ends connected to terminals 16 adapted for connection to a source of potential, not shown. When current flows through the conductor 14, a magnetic field, extending perpendicular to the long transverse dimension of the wave guide 10, will be produced in the ferrite plate 12. The hysteresis loop for the ferrite plate 12 is shown in FIG. 1A. As current flows through the conductor 14, it creates a circumferential magnetic field that saturates the ferrite (point A in FIG. 1A). Since the geometry of the ferrite is designed to provide a closed magnetic path within the material, a remnant magnetization is retained after the current is shut off as illustrated for example, by point B in FIG. 1A. As in conventional ferrite devices, this biasing field establishes a specific permeability and introduces a certain phase shift in the microwave transmission line.

A current in the opposite direction through the conductor 14 establishes a reverse field that drives the material to saturation at the opposite extreme of the hysteresis loop, as shown by point C in FIG. 1A. Again, when current ceases to flow and the magnetizing field is removed, a remnance magnetization is retained (point D in FIG. 1A). However, this field is now reversed relative to the first remnance state. This condition establishes a different permeability and produces a different phase shift in the microwave transmission line. Thus, a differential phase shift can be obtained simply by reversing the polarity of the biasing current. Since operation is at the two stable remnance states identified as points B and D in FIG. 1A, only a current pulse is required to latch and no current need be maintained after latching. The degree of phase shift effected by the ferrite plate 12 of FIG. 1 is dependent upon its volume and length.

Let us assume in FIG. 1 that the vector A represents the electric vector of a linearly polarized wave of the $TE_{11}$ mode in the circular wave guide 10. This incident electric field vector A can be resolved into two orthogonal components, one perpendicular to and one parallel to the ferrite plate 12. These two orthogonal components are identified as $A_y$ and $A_z$, respectively.

As will be appreciated, the component $A_z$ will be retarded in phase to a greater extent than the component $A_y$, and the two components will emerge from the other side of the plate 12 as components $A'_z$ and $A'_y$ wherein the component $A'_z$, having passed through the ferrite plate 12, is retarded with respect to the component $A'_z$ by the distance L. If the distance L between the two vectors $A'_z$ and $A'_y$ is equal to $\pi/2$ radius in terms of the wavelength of a propagated electromagnetic wave, the effect is the same as the familiar quarter wave plate and circular polarization is produced.

This is perhaps best illustrated in FIG. 2 wherein the field configuration of the electric vectors is illustrated at spaced points along the wave guide. The wave energy, before it reaches the ferrite plate 12, has the field configuration identified by the reference numeral 18 and comprises linearly polarized wave energy in which the electric vectors are at an angle of 45 degrees with respect to the major axis of the plate 12. After passing through the plate 12, one component of the linearly polarized wave energy is delayed with respect to the other by $\pi/2$ radians, thereby producing the spaced field configurations 20, 22, 24 and 26 each spaced from the others by $\pi/2$ radians. The result is circular polarization in a clockwise direction. That is, the electric vectors rotate in a clockwise direction as they travel along the wave guide.

If the ferrite plate 12 is now latched in the reverse direction as by passing a current plate through the conductor 14 in the opposite direction, a phase shift of $3\pi/2$ radians is produced between the vectors $A'_z$ and $A'_y$. This is illustrated in FIG. 3 where the electric vectors, illustrated by the field configurations 28, 30, 32 and 34, are all spaced by $\pi/2$ radians apart and are now rotating in a counterclockwise direction as they move along the axis of the wave guide.

With reference now to FIG. 4, another embodiment of the invention is shown which again includes a wave guide section 36 having four latchable ferrite devices 38, 40, 42 and 44 spaced along its axis. It will be noted that the latchable ferrite devices 38 and 40 are disposed horizontally within the wave guide 36; while the latchable ferrite devices 42 and 44 are at right angles thereto and disposed in a vertical plane. Each of the ferrite devices 38–44 is again provided with a center conductor 46 through which a pulsed or steady-state current may flow in opposite directions to latch the ferrite positively or negatively as explained above. Each of the ferrite devices 38–44 is adapted to retard an electric vector passing therethrough by one-quarter wavelength of the applied wave energy.

Figure 5:
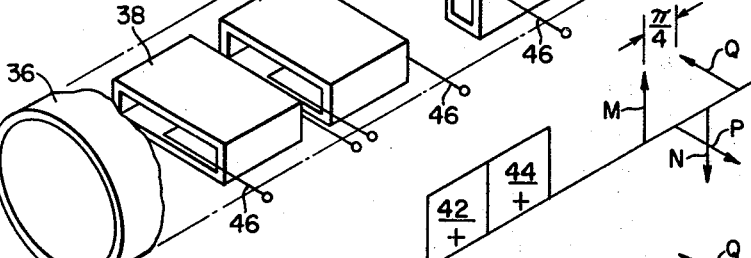
FIG. 5 is a vectorial representation of circularly polarized wave energy impinging upon the ferrite devices of FIG. 4 when all of the ferrite devices are latched in the same sense.

The effect of various conditions of the ferrite devices 38–44 is illustrated schematically in FIGS. 5–8. In FIG. 5, it is assumed that a circularly polarized wave, represented by the vectors M, N, P and Q, impinges on the orthogonal ferrite combination and that all of the ferrite devices or bits are latched either positively or negatively. For the assumed case in FIG. 5, all are latched positively, meaning that they will all retard the incident wave energy by one-quarter wavelength. Under the conditions illustrated in FIG. 5, the vectors M and P will each be retarded by one-half wavelength in passing through the ferrite devices 42 and 44. Similarly, the vectors P and Q will each be retarded by one-half wavelength in passing through the devices 38 and 40. The result is that the vectors M', N', P' and Q' all retain their original phase positions and, except for a phase delay, retain the same sense of polarization as they emerge from the polarizing network.

Figure 6:
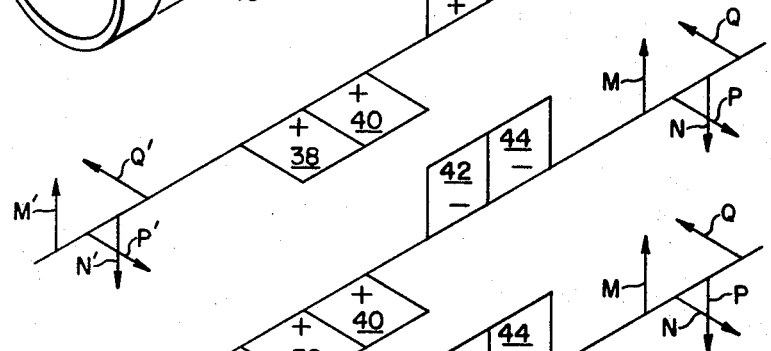
FIG. 6 is a vectorial illustration of the effect of the ferrite devices of FIG. 4 when one pair of ferrite devices is latched positively and the other is latched negatively.

Let us assume now, that devices 42 and 44 are latched negatively while devices 38 and 40 are latched positively as shown in FIG. 6. Under these circumstances, the vectors M and N will experience a phase shift of 180° more than the vectors of P and Q, thereby producing the emerging vector configuration P', M', Q' and N'. Under the circumstances described, it can be seen that a reversal in rotation of the circularly polarized wave has occurred. Similarly, if devices 38 and 40 are latched negatively and devices 42 and 44 are latched negatively, vectors P and Q will experience a phase shift of 180° more than the vectors M and N. The result would be the same; that is, a reversal in the direction of rotation of the circularly polarized wave.

Figure 7:
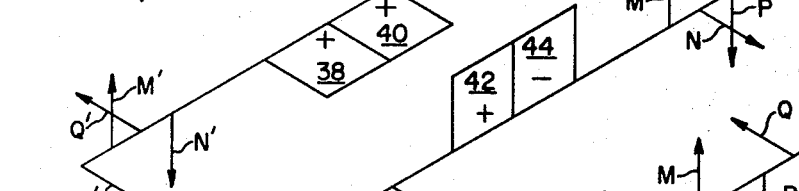
FIG. 7 is a vectorial representation of the effect on circularly polarized wave energy when three of the four ferrite devices of FIG. 4 are latched positively and only one is latched negatively.

Now, let us assume that as shown in FIG. 7, only the ferrite device 44 is latched negatively while the remaining devices 38, 40 and 42 are latched positively. Under these circumstances, the vectors M and N will be delayed by one-quarter wavelength, whereby they coincide in phase with the vectors P and Q to produce the vector configurations M', P', Q' and N' of FIG. 7. Note that in this case the vectors M' and P' are separated from the vectors Q' and N' by one-half wavelength. The vectors M' and N' are in space phase and time quadrature to vectors P' and Q'. This yields a linearly polarized wave of an orientation of 45 degrees to both sets of ferrite devices 38, 40 and 42, 44.

Figure 8:
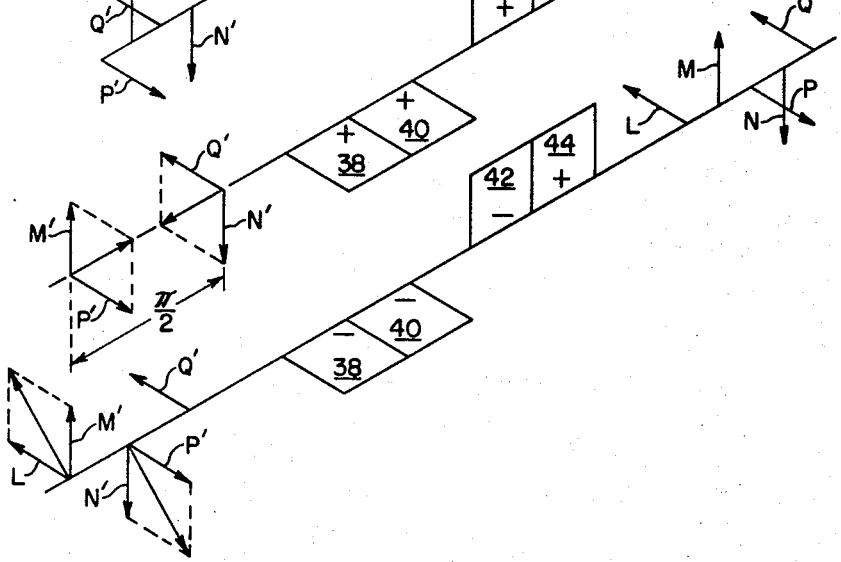
FIG. 8 is a vectorial representation of the effect on circularly polarized wave energy when three of the four ferrite devices of FIG. 4 are latched negatively and only one is latched positively.

In FIG. 8, the ferrite device 44 is latched positively and all of the remaining devices are latched negatively. Under these circumstances, vectors P, Q and L are retarded by 90 degrees relative to vectors M and N. A linearly polarized wave now emerges whose orientation is orthogonal to that shown in FIG. 7.

The present invention thus provides a means, utilizing latchable ferrite devices, for converting linearly polarized wave energy into circularly polarized wave energy of either sense and for reversing the sense of rotation of polarized wave energy or for converting circularly polarized wave energy into linearly polarized wave energy. Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A phase shifter comprising a wave guide transmission line, at least one latchable ferrite body of generally rectangular cross section having a major axis and a minor axis positioned in said transmission line and extending in parallel relation to the axis of said transmission line, the major axis of the rectangular cross section of said ferrite body being at an angle of 45 degrees to the electric vectors of linearly polarized wave energy passing through the transmission line, an electrical conductor extending through said ferrite body parallel to the axis of said transmission line, and means for causing current to flow through said conductor to thereby create in said ferrite body a magnetic field at right angles to the length of said transmission line.

2. The phase shifter of claim 1 wherein the wave energy incident on said one ferrite body is linearly polarized and said ferrite body shifts the phase of one electric vector component of the linearly polarized wave by $\pi/2$ radians to produce circularly polarized wave energy.

3. The phase shifter of claim 1 wherein the wave energy incident on said one ferrite body is linearly polarized and said ferrite body shifts the phase of one electric vector component of the linearly polarized wave by $3\pi/2$ radians to produce circularly polarized wave energy.

4. The phase shifter of claim 1 wherein said wave guide transmission line is circular in configuration.

5. The phase shifter of claim 1 wherein there are two sets of latchable ferrite bodies disposed in said wave guide transmission line, the ferrite bodies having their minor axes coaxally aligned with the major axes of one set being at right angles to the major axes of the other set.

6. The phase shifter of claim 5 wherein a separate electrical conductor extends through each of the four ferrite bodies whereby each ferrite body may be latched positively or negatively independently of the others.

7. The phase shifter of claim 5 wherein the ferrite bodies in one set are both latched positively while those in the other set are both latched negatively whereby the sense of rotation of incident circularly polarized wave energy will be reversed.

8. The phase shifter of claim 5 wherein one of the four ferrite bodies is latched with one polarity while the remaining three are latched with the opposite polarity whereby incident circularly polarized wave energy will be converted into linearly polarized wave energy in passing through the ferrite bodies.

9. The phase shifter of claim 5 wherein each ferrite body shifts the phase of incident wave energy by one-quarter wavelength.

References Cited

UNITED STATES PATENTS 3,361,993   1/1968   Jones et al. _____ 333—24.1

HERMAN K. SAALBACH, Primary Examiner

M. NUSSBAUM, Assistant Examiner

U.S. Cl. X.R.

333—24.1